US 6,697,346 B1

United States Patent
Halton et al.

(10) Patent No.: US 6,697,346 B1
(45) Date of Patent: Feb. 24, 2004

(54) AUTOMATIC DETERMINATION POINT FOR RANDOM ACCESS CHANNEL PARTITIONING SCHEME

(75) Inventors: John Halton, Ulm (DE); Paul James, Bochum (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/412,186

(22) Filed: Oct. 4, 1999

(30) Foreign Application Priority Data

Oct. 5, 1998 (EP) .............................. 98118817

(51) Int. Cl.[7] .............................................. H04B 7/216
(52) U.S. Cl. ........................ 370/335; 370/342; 370/441
(58) Field of Search ................................ 370/328, 329, 370/341, 345, 347, 348, 335, 342, 441, 336, 442, 443, 337; 455/562, 561

(56) References Cited

U.S. PATENT DOCUMENTS

| 4,546,427 A | * | 10/1985 | Kishi et al. ................. 318/570 |
| 5,123,029 A | | 6/1992 | Bantz et al. ................. 375/133 |
| 5,570,355 A | * | 10/1996 | Dail et al. .................... 370/352 |
| 5,577,024 A | * | 11/1996 | Malkamaki et al. ........ 370/335 |
| 5,644,576 A | | 7/1997 | Bauchot et al. ............... 703/23 |
| 5,896,385 A | * | 4/1999 | Achilleoudis ............... 370/443 |
| 5,953,344 A | * | 9/1999 | Dail et al. .................... 370/443 |

FOREIGN PATENT DOCUMENTS

| EP | 0 475 698 A2 | 3/1992 |
| EP | 0 765 096 A2 | 3/1997 |
| WO | WO 97/06622 | 2/1997 |

* cited by examiner

Primary Examiner—Sinh Tran
Assistant Examiner—Eliseo Ramos-Feliciano
(74) Attorney, Agent, or Firm—Frommer Lawrence & Haug LLP; William S. Frommer; Bruno Polito (57) ABSTRACT

The present invention relates to a method and to devices (26, 27) for transmitting and receiving data in a code division multiple access telecommunication system. A random access time window (1) is provided, which comprises a plurality of random access slots for transmitting random access data from at least one first communication device (27) to a second communication device (26). A partition point is determined, which defines a number of contention based random access slots and a number of reservation based random access slots in the random access time window on the basis of statistical information generated in at least one first communication device (27). The random access time window (1) is partitioned in a first and a second section on the basis of said partition point, whereby the first section contains contention based random access slots and the second section contains reservation based random access slots. The present invention thereby allows to dynamically adapt the random access time window resources to changing requirements and an optimal utilization of the resources.

23 Claims, 9 Drawing Sheets

AUTOMATIC DETERMINATION POINT FOR RANDOM ACCESS CHANNEL PARTITIONING SCHEME

FIELD OF THE INVENTION

The present invention relates to a method and to devices for transmitting and receiving data in a code division multiple access telecommunication system.

BACKGROUND OF THE INVENTION

A telecommunication system is a system, in which data are communicated between one or more base stations and one or more mobile stations. Thereby, the communication area is divided in cells, in which one base station communicates with one or more mobile stations. Multiple access systems are used to support the simultaneous access of a plurality of mobile stations to one base station within the limited resources of the transmission system. Several multiple access systems are known, e.g. frequency division multiple access (FDMA), time division multiple access (TDMA), or code division multiple access (CDMA). Additional to these basic types of multiple access systems, combinations of these different systems are possible and in practical use. The GSM-System for example uses a combination of FDMA and TDMA.

The present invention particularly relates to the transmission and reception of random access data in a code division multiple access system. Random access data are transmitted in the so-called random access slot (RACH) from a mobile station to build up a connection or to transmit data. The random access data from the mobile station contain a request, if the base station has sufficient resources available to build up the required connection or to transfer user data.

The random access slot comprises or consists of succeedingly or periodically provided random access time windows, in which several random access slots are available. The different random access slots are randomly chosen by a mobile station for the transmission of random access data. In a currently proposed wide band direct sequence CDMA (WCDMA) system, the random access time windows are based upon an initial preamble scrambling code, which differentiates between one cell and another cell. Thereby, these codes need to be planned to ensure that neighboring cells do not use the same code. Therefore, within the preamble part of each random access slot burst, is provided the preamble signature, which is one of 16 separate codes available for use within that cell. These 16 codes can be seen as separate slots. One of these codes is chosen randomly by the mobile station for the transmission of random access data. Beforehand, the base station broadcasts, which codes are available in each cell over the broadcast control channel (BCCH). In addition, within one time frame (10 ms) are provided 8 time offsets, each of 1,25 ms, allowing a further 8 variations. In other words, in each time frame a random access time window is provided, which comprises a plurality of random access slots for transmitting random access data from one or more mobile stations to the base station. The random access time window thereby extends over the time frame of 10 ms, so that 128 different random access slots (16 separate preamble codes and 8 time offsets) are provided within one random access time window.

A collision, i.e. a situation, where messages from two or more mobile stations collide and are lost, only occurs, when both the preamble code and the time offset are chosen in the same random access time window. In practice, it is expected that only about 30% of the theoretical maximum of 128 accesses per 10 ms will be possible.

Figure 1:
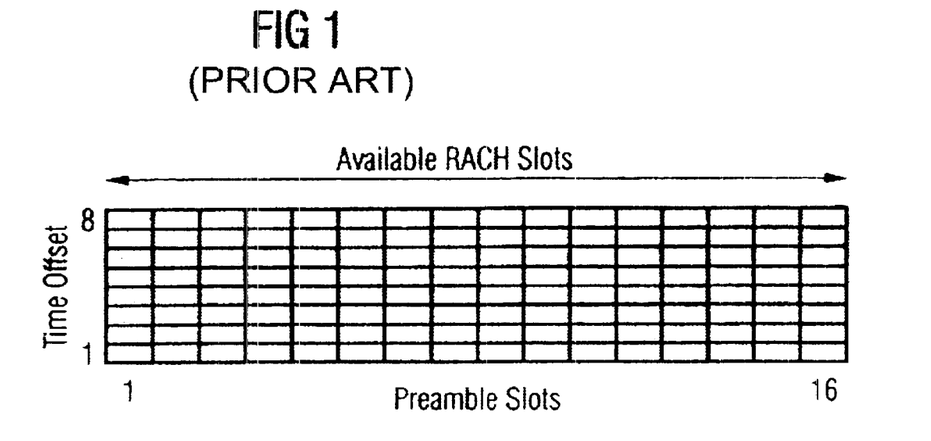
FIG. 1 shows a schematic diagram of a known random access time window.

In a situation, where a number of packet data users are operating in a bursty traffic situation, this maximum could be quickly reached. In such a situation the access to the network will either become slower or not be possible at all. This is due to congestion caused by the build up of first time requests and the retransmissions made necessary by previous collisions. Since the access to the random access slots is only contention based as shown in FIG. 1, a guaranteed upper limit on the amount of time needed to access the system even after an initial burst is not ensured. For packet data applications, which demand a constant periodic delivery of data, ready access is critical.

WO 98/24250 discloses a TDMA system, which allocates a fixed random access slot constantly to a particular mobile station.

The object of the present invention is thus to provide a method and devices for transmitting and receiving data in a code division multiple access telecommunication system, in which a random access time window comprising a plurality of random access slots for transmitting random access data is provided, whereby the random access time window is partioned on the basis of a partition point in the first section comprising contention based random access slots and a second section comprising reservation based random access slots, and in which an optimal setting of the partition point is ensured, so that the random access time window resources are fully utilized. The importance of an effective random access slot utilization arises particularly from increased load from packet data capacity requests and the transfer of small amounts of user data within random access slot burst.

This object is achieved by a method for transmitting and receiving data in a code division multiple access telecommunication system, comprising the steps of providing a random access time window comprising a plurality of random access slots for transmitting random access data from at least one communication device to a second communication device, determining a partition point defining a number of contention based random access slots and a number of reservation based random access slots in the random access time window on the basis of statistical information generated in at least one first communication device, and partitioning the random access time window in a first and a second section on the basis of said partition point, whereby the first section contains contention based random access slots and the second section contains reservation based random access slots. The first communication devices can thereby be mobile stations and the second communication device can thereby be a base station of the telecommunication system. Reservation based random access slots are slots which cannot be accessed on a contention basis, but only if they had been reserved before.

The above object is further achieved by a device for transmitting and receiving data in a code division multiple access telecommunication system, in which a random access time window comprising a plurality of random access slots for transmitting random access data is provided, the random access time window being partitioned in a first and a second section, whereby the first section contains contention based random access slots and the second section contains reservation based random access slots, with means for randomly choosing a random access slot from said first section, means for transmitting random access data in said chosen random access slot, and means for generating statistical information on contention based random access attempts. This device for transmitting and receiving data is e.g. a mobile station of the telecommunication system.

The above object is further achieved by a device for transmitting and receiving data in a code division multiple access telecommunication system, in which a random access time window comprising a plurality of random access slots for transmitting random access data is provided, with means for determining a partition point defining a number of contention based random access slots and a number of reservation based random access slots and a random access time window on the basis of received statistical information, means for partitioning the random access time window in a first and a second section on the basis of said partition point, whereby the first section contains contention based random access slots and the second section contains reservation based random access slots, and means for broadcasting information on the partition point of said random access time window. This device for transmitting and receiving data can for example be a base station of the telecommunication system.

The partitioning of the random access time window into the first section containing contention based random access slots and a second section containing reservation based random access slots allows to reduce congestion in the random access slots and to more efficiently utilize the resources of the random access time window. The determination of the partition point on the basis of statistical information generated e.g. in a mobile station allows an optimal setting of the partition point, so that random access time window resources can be fully utilized and initial access requests or random access slot reservations can be optimized. The present invention thus provides an automated mechanism for the determination of the partition point, so that the random access time window can be flexibly modified from one moment to the next moment to adapt the random access time window to dynamically changing environments and requirements.

Advantageously, the statistical information is information on contention based random access attempts in said at least one first communication device, which e.g. can be a mobile station. Before the transmission of random access data in a contention based random access slot, a mobile station randomly chooses a random access slot from the first section of the random access time window. Then, the mobile station transmits random access data in this chosen random access slot. At this time, the mobile station does not know if the transmission of the random access data in the chosen random access slot was successful. Only upon receiving of a corresponding notification from the respective base station, the mobile station is informed, if the random access data transmission attempt was successful. The first communication device, which e.g. can be a mobile station, thus comprises a means for generating statistical information on these contention based random access attempts. Advantageously, said means for generating statistical information determines the number of failed contention based random access attempts within a predetermined period of time. In this case, said means for generating statistical information can accumulate the number of failed contention based random access attempts and provide the corresponding second communication device, which e.g. can be a base station, with corresponding statistical information. The corresponding second communication device, which can e.g. be a base station, receives the corresponding statistical information from one or more first communication devices, which can be mobile stations, and sets the partition point of the random access time window correspondingly. Thereby, information on the partition point is, e.g. periodically, broadcast to a mobile station.

Said device for transmitting and receiving data according to the present invention, which can be a base station, comprises a means for determining said partition point on the basis of the number of failed contention based random access attempts in one or more further devices, which can e.g. be mobile stations, within a predetermined period of time. Said means for determining the partition point advantageously increases the number of contention based random access slots in said random access time window in case that the number of failed contention based random access attempts reaches a predetermined contention threshold value. Thereby, said means for determining the partition point advantageously decreases the number of contention based random access slots in said random access time window in case that the number of failed contention based random access attempts falls under a predetermined reservation threshold value. Preferably, said reservation threshold value is smaller than said contention threshold value, whereby a buffer space is provided in between the reservation and the contention threshold value. Within the buffer space, the number of failed contention based random access attempts can vary without a subsequent changing of the partition point, so that small oscillations of the partition point are avoided and the amount of the required signaling is decreased.

In an alternative embodiment of the device for transmitting and receiving data according to the present invention, which can be a base station, said determining means determines the partition based on the basis of the number of failed contention based random access attempts of one or more further devices, which can e.g. be mobile stations, within a predetermined period of time, whereby the partition point is calculated arithmetically. In this embodiment, no contention or reservation threshold values are set, but the partition point is varied according to predetermined mathematical criteria.

Each random access slot in said random access time window can be defined by a time offset value and a preamble code. Further, said second communication device (which e.g. can be a base station) periodically transmits partitioning information defining the partition point of the random access time window to at least one first communication device, which for example can be a mobile station. The first communication device, which for example can be a mobile station, randomly chooses one of said random access slots from said first section of said random access time window for transmitting random access data to the second communication device, which for example can be a base station.

Advantageously, said random access data transmitted in a random access slot of said first section comprises reservation data for reserving at least one random access slot of said second section in at least one succeeding random access time window. Thereby, ready access for packet data applications is ensured, which demand a constant delivery of data. In this case, said reservation data can comprise data on the time duration required for the total number of reserved random access slots to indicate the end of the reservation. Thereby, the reservation of random access slots in the second section of succeeding random access time windows ends automatically upon expiring of the pre-set time period. Said reservation data can further comprise information on a number of random access slots to be reserved in the first succeeding random access time window and information on a continues reduction of said number in the following random access time windows. In this case, the number of reserved random access slots in the second sections of succeeding random access time windows can be decreased gradually until the end of the reservation term.

Said first communication device, which can for example be a mobile station, can transmit reservation termination data in a first or second section of a random access time window for indicating the end of the reservation of the required random access slot. This might be necessary in cases, in which already reserved random access slots in the second sections of succeeding random access time windows are not necessary and have to be released for usage by other users. Alternatively, said second communication device, which can for example be a mobile station, terminates the reservation upon determination of a non-usage of reserved random access slots. The second communication device can thereby automatically terminate the reservation if it is determined, that reserved random access slots are not used. In this case, the second communication device can transmit information on the termination of the reservation to the corresponding first communication device to inform that earlier reserved random access slots in second sections of succeeding random access time windows are not reserved anymore.

The device for transmitting and receiving data according to the present invention, which might be a mobile station, can further comprise means for receiving periodically transmitted partitioning information defining the partition point of said random access time window.

The device for transmitting and receiving data according to the present invention, which might be a base station, might further comprise means for receiving random access data in one of said random access slots from said first section of said random access time window. Said means for partitioning the random access time window advantageously sets the number of random access slots in said first and second section respectively, variably depending on the partition point, whereby said means for transmitting partition point information periodically transmit said partitioning information. Said device for transmitting and receiving data, which might be a base station, can further comprise means for determining a non-usage of reserved random access slots, whereby the reservation is terminated upon a positive result of said determination. Said means for transmitting information can thereby transmit information on the termination of the reservation upon a positive result of said determination.

In the method and devices for transmitting and receiving data according to the present invention, the random access time window is partitioned into a first and a second section, whereby the first section contains contention based random access slots, and the second section contains reservation based random access slots. The reservation based random access slots can be dedicated to a communication device, e.g. a mobile station, for a limited time. A request for guaranteed reservation of reservation based random access slots is made through an initial contention based random access slot. Thereby, the network or the base station may also assign a reserved random access slot. These reserved random access slots are then used for uplink data transfer between a mobile station and a base station or requests for a channel to transmit user data. Since the partitioning of the random access time window can be set variable depending on system requirements, the random access slot resources in the random access time window can be used more efficiently, e.g. by minimizing contention based access, since band-width is not used for retransmissions when bursts collide. Furthermore, a breakdown can be avoided, which can occur, when the number of retries and subsequent retransmissions increase the number of collisions until deadlock occurs. The telecommunication network or the base station can dynamically control the partitioning of the random access resources in the random access time window into contention and reservation based channels. Thus, the exact partition can be tailored to the particular requirements from moment to moment. This partition point information is broadcast to the mobile stations upon the broadcast control channel (BCCH). The present invention thereby particularly enables an optimal utilization of the random access time window resources and a faster access to the communication network particular in cases where a number of packet data users are operating in bursty traffic situations. Further, congestion caused by the build up of first time requests and retransmissions made necessary by previous collisions can be avoided.

BRIEF DESCRIPTION OF THE DRAWINGS

In the following, preferred embodiments of the present invention are explained in detail referring to the enclosed figures, in which.

DETAILED DESCRIPTION OF THE INVENTION

In FIG. 1, a schematic diagram of a known random access time window is shown. In this known random access time window, all available random access slots are contention based. The number of the available contention based random access slots is defined by 8 different time offset values and 16 different preamble codes, so that a total of 128 different random access slots is available per random access time window. In the present application, a random access time window corresponds to the duration of a random access time frame, e.g. 10 ms. It is, however, to be noted, that a random access time window according to the present invention can be defined by other parameters as long as a plurality of random access slots for transmitting random access data are available within a certain time period. Further, throughout the following description, the present invention is explained relating to a telecommunication system comprising a base station as for example shown in FIG. 15 and one or more mobile stations as for example shown in FIG. 14.

Figure 2:
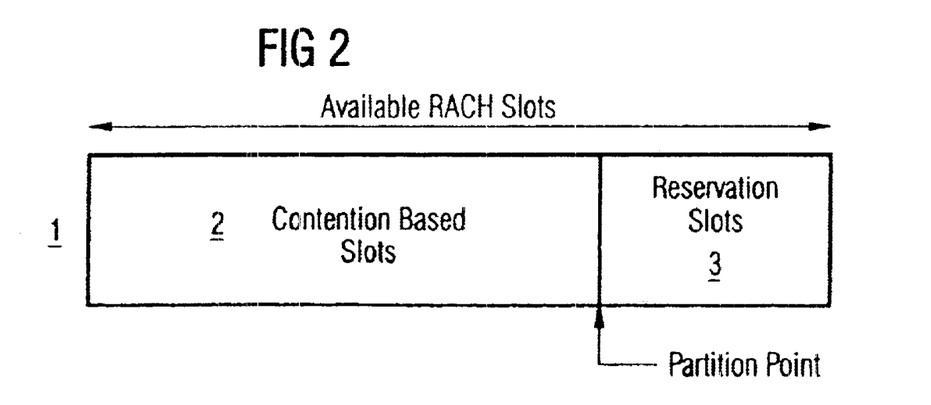
FIG. 2 shows a schematic diagram of a first example of a random access time window according to the present invention.
Figure 13:
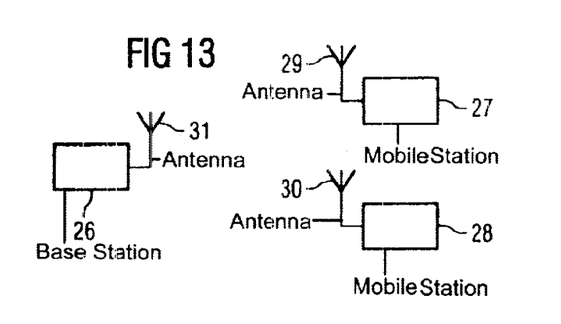
FIG. 13 shows a block diagram of a base station and two mobile stations incorporating the present invention.
Figure 14:
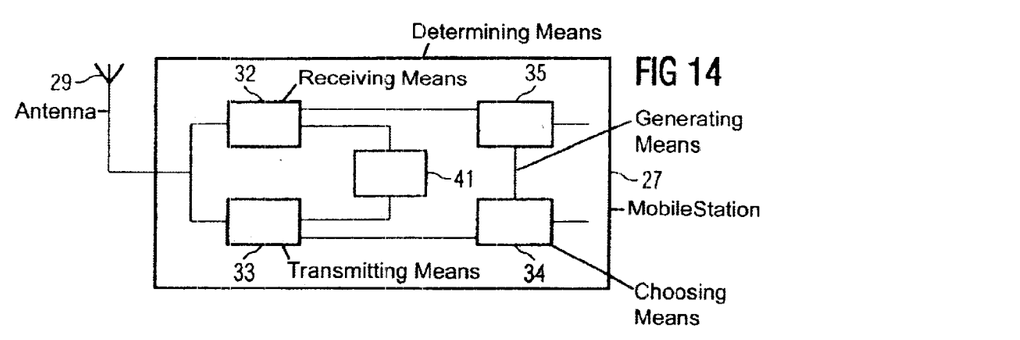
FIG. 14 shows a block diagram of a mobile station incorporating the present invention.

In FIG. 2, a schematic diagram of a first example of a random access time window 1 according to the present invention is shown. The shown random access time window 1 is partitioned into a first section 2 and a second section 3. The first section 2 contains contention based random access slots and the second section 3 contains reservation based random access slots. The contention based random access slots are used for initial access, singular packet transfer and for reservation of additional dedicated random access slots for a time period within the second section of succeeding random access time windows. The reservation based random access slots in the second section of the random access time window 1 can be allocated to mobile stations, for example as shown in FIG. 13 and FIG. 14, which periodically on a regular basis wish to transfer uplink packet data or make a request for channel reservations to transfer data.

The partition point shown in the random access time window 1 of FIG. 2 allocates a larger number of random access slots to the first section 2 than to the second section 3. Hereby, the partition point only divides the random access time window 1 in view of the preamble codes. In other words, a certain part of the preamble codes available, e.g. 10 of a total of 16 preamble codes, is allocated to the first section 2, whereas the rest of the preamble codes, e.g. the remaining 8 of a total of 16 preamble codes, is allocated to the second section 3. In the example shown in FIG. 2, all time offset values, e.g. 8 different time offset values, remain available for the random access slots in the first section 2 as well as the second section 3.

Figure 3:
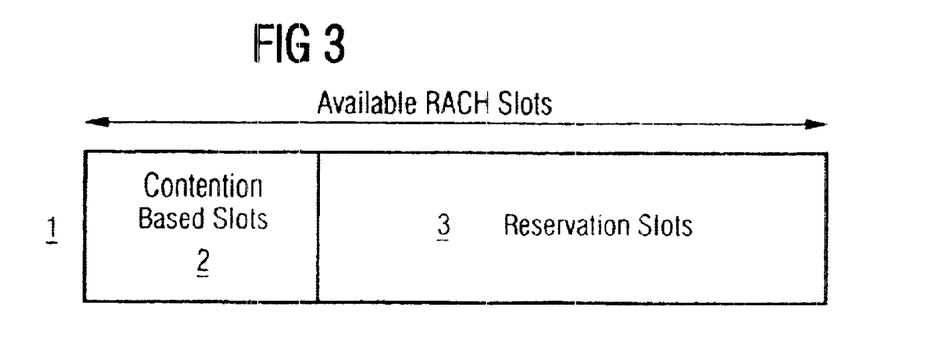
FIG. 3 shows a schematic diagram of a second example of a random access time window according to the present invention.

The actual position of the partition point is determined and can therefore be dynamically controlled on the basis of statistical information from the mobile stations, but with respect to current random access slot reservation commitments. In case that a large number of mobile stations attempts to access the network, the number of contention based random access slots in the first section 2 is increased by moving the partition point to reduce the number of reservation based random access slots in the second section 3. If the demand for packet based data is high, the partition point may be moved to reduce the number of contention based random access slots in the first section 2 and create more available reservation based random access slots in the second section 3. This possibility is shown as a second example in the schematic diagram of a random access time window in FIG. 3. In the example shown in FIG. 3, the first section 2 contains a smaller number of contention based random access slots than the second section 3 contains reservation based random access slots. The determination of the partition point is explained in detail relating to FIG. 13–FIG. 17.

Figure 4:
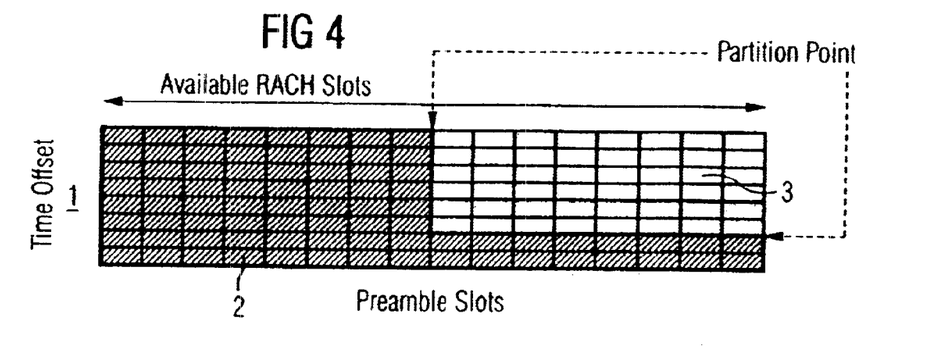
FIG. 4 shows a schematic diagram of a third example of a random access time window according to the present invention.

In FIG. 4, a third example of a random access time window according to the present invention is shown. In the example shown in FIG. 4, the partitioning point divides the first section 2 from the second section 3 by partitioning the time offset values as well as the preamble codes, so that the random access time window 1 is partitioned in two dimensions. In the example shown in FIG. 4, only 6 of a total of 8 time offset values and 8 of a total of 16 preamble codes are available for the reservation based random access slots in the second section 3.

Figure 5:
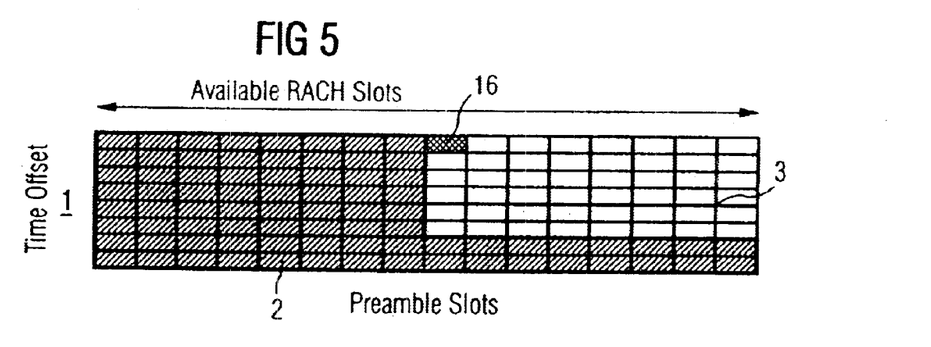
FIG. 5 shows a schematic diagram of a random access time window succeeding the random access time window shown in FIG. 4.

In FIG. 5, a random access time window is schematically shown, which is partitioned identically to and succeeds the random access time window shown in FIG. 4. One of the random access slots of the second section 3 of the time window shown in FIG. 5, which is identified by the reference numeral 16, is a reserved random access slot, which has been reserved by one of the contention based random access slots of the first section 2 of the time window shown in FIG. 4.

Figure 6:
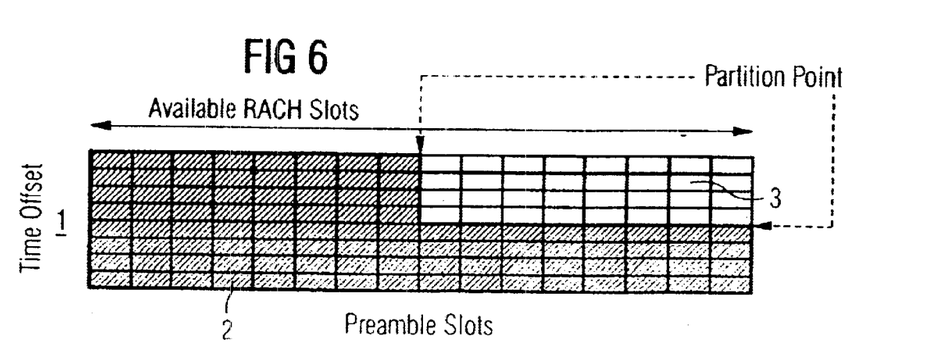
FIG. 6 shows a schematic diagram of a fourth example of a random access time window according to the present invention.

In FIG. 6, a fourth example of a random access time window 1 according to the present invention is shown, which illustrates another partitioning of the random access time window. The random access time window shown in FIG. 6 is divided in two dimensions, whereby 8 of a total of 16 preamble codes and 4 of a total of 6 time offset values are allocated to the second section 3.

Figure 7:
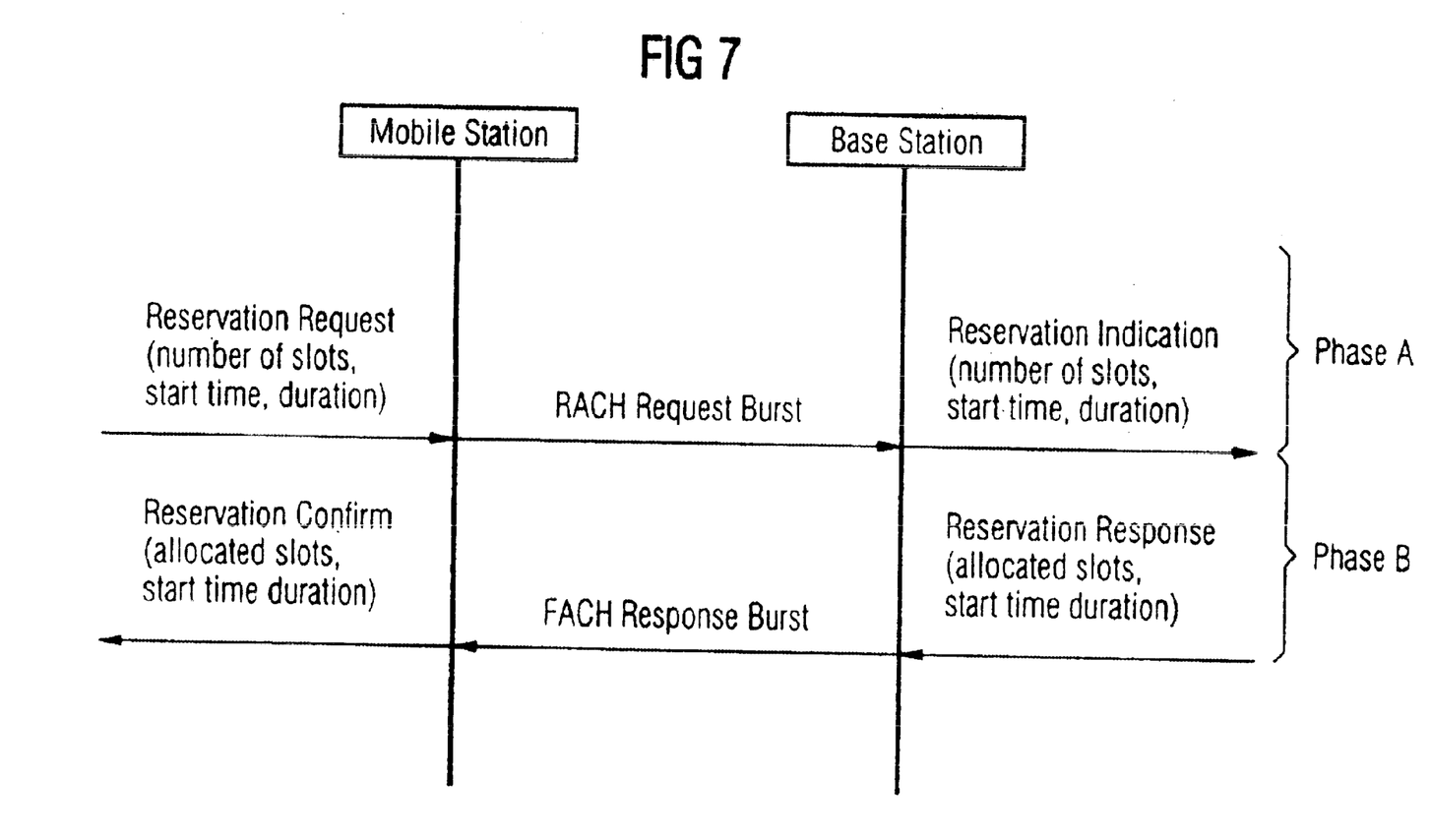
FIG. 7 shows a diagram of a reservation procedure for reserving reservation based random access slots according to the present invention.

In FIG. 7, the signaling procedure for the reservation of reservation based random access slots is explained. A mobile station 27 as for example shown in FIG. 14 wishes to transmit packet-oriented data and therefore makes a request for a reservation based random access slot using a contention based random access slot. Therefore, the mobile station 27 randomly chooses a time offset value and a preamble code from the available contention based random access slots of section 1 of the current random access time window and transmits the required reservation information to the corresponding base station as for example shown in FIG. 15. The required reservation information can e.g. comprise the number of random access slots to be reserved, the start time of the required random access slots to be reserved and the total duration of the reservation. The base station 26 determines, if it has enough resources in the corresponding second section 3 of the succeeding random access time windows to grant the reservation request from the mobile station 27. In other words, the base station 26 decides, if sufficient reservation based relevant access channels in the succeeding random access time windows are available and sends, if the decision is positive, a corresponding response, e.g. on the forward access channel, back to the mobile station 27. The response burst contains the reservation parameters, e.g. the time the reservation is available and the duration of the reservation. Should the base station 26 wish to allocate less random access slots in the second section 3 of the succeeding random access time windows as requested by the mobile station 27 or not be able to grant the request at all, this can also be indicated within the response burst.

In case that the response burst from the base station 26 grants all the required reservation resources to the mobile station, the mobile station transmits e.g. packet orientated random access bursts using the preamble code and the time offset value provided in the burst response from the base station. For example, random access slot 16 shown in the second section 3 of the random access time window of FIG. 5 is a random access slot, which had been reserved by a corresponding request sent within a random access slot of the first section 2 of the preceding random access time window shown in FIG. 4.

In case that the base station determines or receives information that the number of the contention based random access slots need to be increased, it broadcasts the new partition point to the corresponding mobile stations, so that the succeeding random access time windows are partitioned correspondingly.

Figure 8:
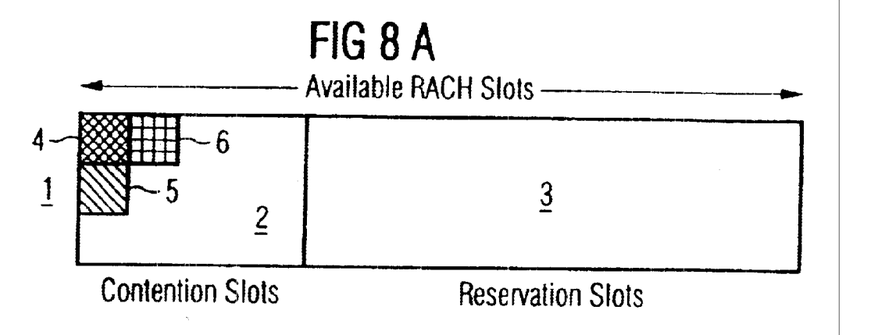
FIG. 8 shows four schematic diagrams of random access time windows according to the present invention for explaining the use of contention based random access slots and reservation based random access slots according to the present invention.

In FIG. 8, four schematic diagrams (a)–(d) are shown to explain how contention based random access slots of the first section 2 of a random access time window are used to reserve reservation based random access slots in the second section 3 of succeeding random access time windows. Although the diagrams of FIG. 8 are shown for a single time domain, it is to be noted, that the reservation principle takes place in the continuous time domain.

The mobile station 27 selects a preamble code and a time offset from the set of available contention based random access signals and constructs a random access burst. The random access burst also contains the required resource reservation, e.g. the required number of random access slots to be reserved, the required duration of the reservation, the desired reservation policy, and the desired release procedure. The random access slot burst may further contain requests for a number of independent reservations. The random access burst is then transmitted from the mobile station over the air interface to a base station 26. The diagram shown in FIG. 8(*a*) shows three simultaneously transmitted initial random access bursts 4, 5, 6, transmitted in the corresponding random access slots of the first section 2 of the current random access time window. The random access bursts 4, 5, 6 are received at the receiver controlling radio resources, e.g. a base station. Thereby, the available set of contention based random access slots and reservation based random access slots is presented on a broadcast channel by transmitting only the corresponding partition point from the base station to the mobile stations 27, 28. Thus, the partition point can be continuously modified and transmitted with a very low overhead.

The base station allocates, if available, the requested resources from the reservation based random access slots in the second sections 3 of the succeeding random access time windows and marks these in use beginning at the requested time and terminating after the requested duration. This is shown in the diagram of FIG. 8(*b*). For the ease of explanation, the initial random access burst 4, 5, 6 of the preceding random access time window are also shown. The random access burst 4 of the preceding random access time window reserves three random access slots 7, 8, 9 in the section 2 of the succeeding random access time window. The initial random access burst 5 reserves one random access slot in the second section 3 of the preceding random access time window. The initial random access burst 6 reserves one random access slot 10 in the second section 3 of the succeeding random access time window.

The actual succeeding random access time window 1 succeeding the random access time window 1 shown in FIG. 8(*a*) is shown in the diagram of FIG. 8(*c*). In this succeeding random access time window 1, no initial random access bursts are transmitted in the random access slots of the first section 2, but the reserved random access slots 7, 8, 9, and 11 in the second section 3 of the random access time window are available for transmitting data. If the base station determines, that fewer resources as requested are available and the mobile station 27 indicated this as reasonable in the indicated desired reservation policy, a maximum of resources within the available resources is selected. If the desired reservation procedure indicated that an exact match must be made, a negative result is generated and no random access slots are reserved in the succeeding random access time windows. A notification of the requested reservation outcome is transmitted to the mobile stations. This includes the allocated random access slots in the second section 3 of the succeeding random access time windows and the valid duration for their use. On reception of the positive notification of a successful reservation, the mobile stations proceed to make random access bursts on the reserved random access slots. The result might be as shown in FIG. 8(*c*). For instance, a web browsing service may use the reserved random access slots to request specific web pages by transmitting the HTML address in the random access burst. Alternatively, the reserved random access slots may be used to request additional channels for up- or Downlink data transfer. The diagram in FIG. 8(*d*) shows how random access slots, that have expired, may be re-allocated to new requests. For example, a new initial random access burst 12 transmitted in the first section 3 of a random access time window may reserve a random access slot 14 with the same address as the old reserved random access slot 11 of FIGS. 8(*b*) and 8(*c*), which has expired. Another new initial random access burst 13 may reserve a new random access slot 15 in the second section 3 of the same succeeding random access time window. Further on, as shown in FIG. 8(*d*), the random access slots 7 and 8, which had been reserved in an earlier random access time window, stay reserved also in the same random access time window as the reserved random access slots 14 and 15.

It is further possible, that the base station 26 automatically assigns a particular reservation based random access slot in each random access time window for a mobile station 27, which makes a large number of accesses to contention based random access slots. The mobile station is informed on the automatic assignment by transmission of the reserved random access slot by the base station.

Reserved random access slots must at some point be relinquished. It is important, that the scheme used should serve the needs of the resource allocator, the resource requester, and the characteristics of data being transmitted either through the random access burst or the establishment of dedicated transport channels. Therefore, relating to FIGS. 9–12, a number of mechanisms are presented, which may be used when requesting and/or terminating reservation of random access slots. In FIGS. 9–12, only reservation based random access slots of the second sections 3 of sequential random access time windows are shown.

Figure 9:
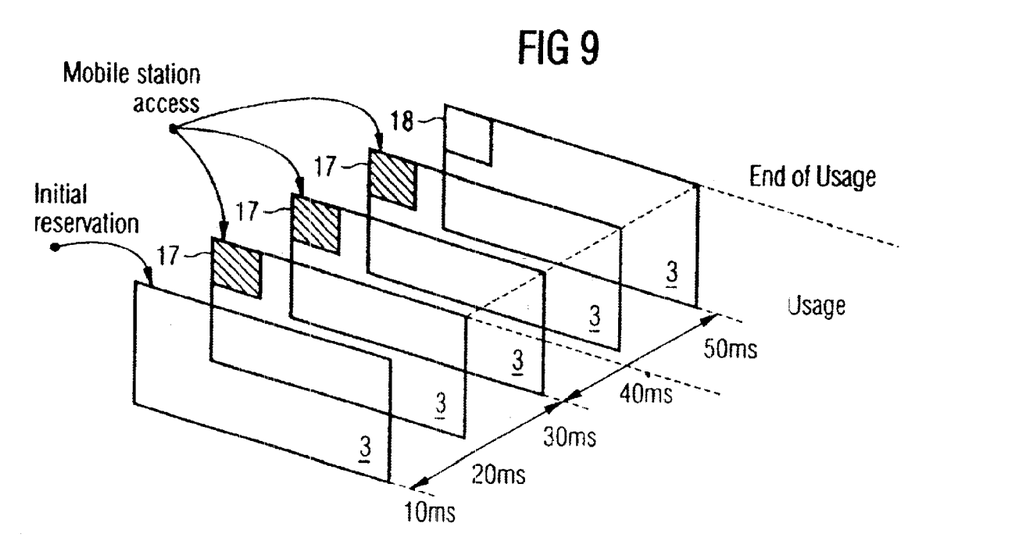
FIG. 9 shows a schematic diagram of a plurality of succeeding second sections of random access time windows according to the present invention for explaining the duration based expiring of reserved random access slots.

FIG. 9 shows an example for a duration based reservation of random access slots in the second section 3. The perspective view in FIG. 9 thereby shows five sequential second sections 3 provided every 10 ms. The initial reservation takes place in the first section 2 (not shown) of the random access time window, of which only the second section 3 is shown at 10 ms. The initial reservation reserves a random access slot 17 in the three succeeding random access time windows shown at 20 ms, 30 ms, and 40 ms. Since the required duration for the reservation based random access slots had been set within the original request, the mobile station is allowed to use the reserved random access slots up until the end of the duration. The end of the duration is reached at the $5^{th}$ random access time window, of which only the second section 3 is shown at 50 ms. At this point, the reserved random access slot 17 is expired and a reservation must be repeated for further access using reservation based random access slots.

Figure 10:
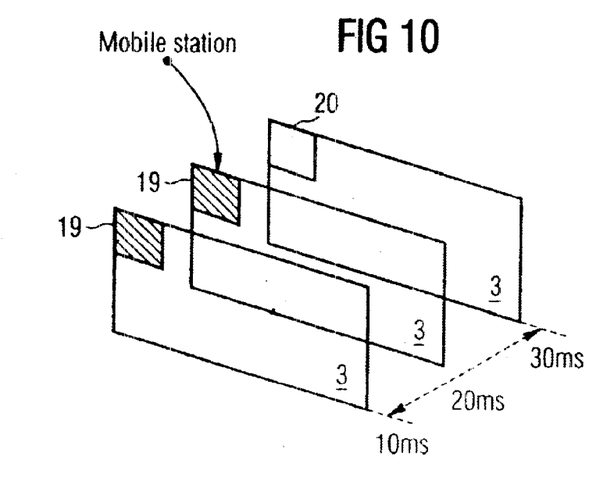
FIG. 10 shows a schematic diagram of a plurality of succeeding second sections of random access time windows according to the present invention for explaining the mobile station originated cancellation of reserved random access slots.

FIG. 10 shows an example for a mobile station originated cancellation of random access slots. The perspective view in FIG. 10 thereby shows three sequential second sections 3 provided every 10 ms. The mobile station might wish to release its use of certain reserved slots immediately. In the example shown in FIG. 10, the succeeding slots 19 had been reserved and used by the mobile station to transmit packet oriented data. Although the corresponding succeeding random access slot 20 in the succeeding random access time window had been reserved initially, the mobile station wishes to cancel this reservation. This case may occur, when a mobile station speculatively asks for a number of future reservations, which subsequently are not required and are released prematurely. It is important, that reservation slots can be removed selectively. The mobile station makes a random access burst using the reservation code, which it wishes to cancel. On reception of the random access burst by the base station, the allocation is removed and the initially reserved random access slot is available to be reallocated.

Figure 11:
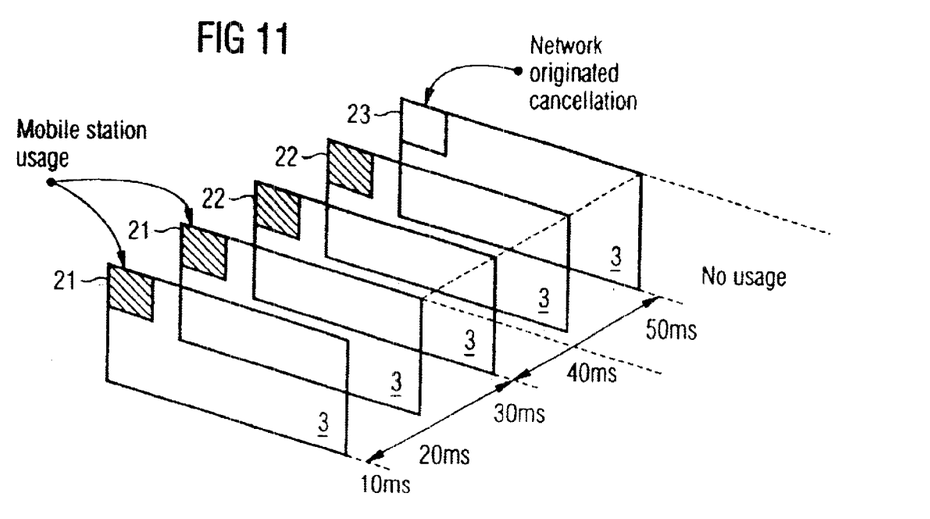
FIG. 11 shows a schematic diagram of a plurality of second sections of random access time windows according to the present invention for explaining the network originated cancellation of reserved random access slots.

FIG. 11 shows an example for a network originated cancellation of random access slots. The perspective view in FIG. 11 thereby shows five sequential second sections 3 provided every 10 ms. A mobile station has reserved succeeding random access slots 21, 22, and 23 of succeeding random access time windows. Of these reserved random access slots, the mobile station uses only the random access slots 21 in the first two succeeding random access time windows to transmit data. The succeeding two random access slots 22 are not used by the mobile station, which is detected by the base station. In other words, if a burst on reserved random access slots has not been received during a predetermined number of time periods, the base station cancels the succeeding reserved random access slots. In the case shown in FIG. 11, the base station cancels the reservation for the succeeding reserved random access slots 23 in the fifth random access time window, since the two preceding random access slots 22 have not been used by the mobile station. It may be necessary for the base station to confirm the cancellation by transmission of a cancellation indication to the mobile station to avoid later collisions within the reserved random access slots. This may occur, when a mobile station later attempts to use a reserved random access slot, which has not been used.

Figure 12:
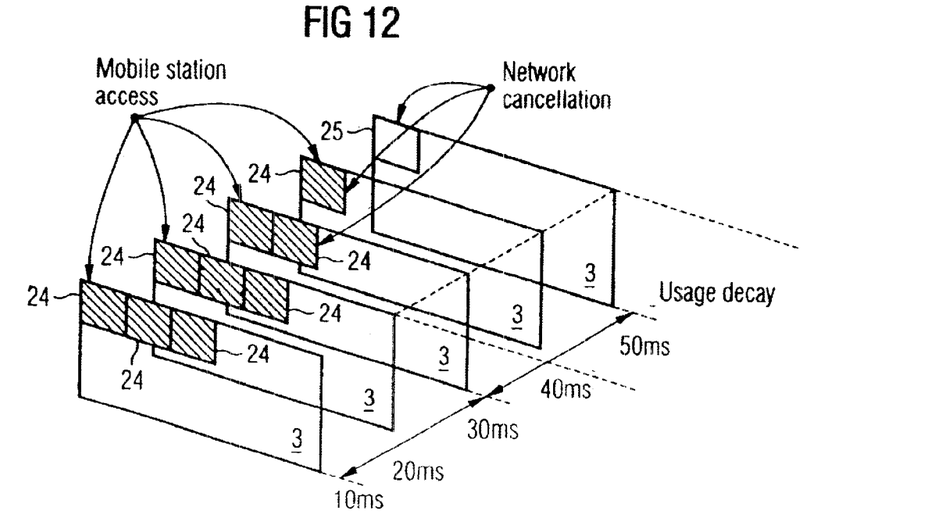
FIG. 12 shows a schematic diagram of a plurality of succeeding second sections of random access time windows according to the present invention for explaining the decay based expiring of reserved random access slots.

FIG. 12 shows an example for a decay based cancellation of random access slots. The perspective view in FIG. 12 thereby shows five sequential second sections 3 provided every 10 ms. The case shown in FIG. 12 is a subcase to the base station originated cancellation shown in FIG. 11. The number of reserved random access slots 24 is decayed over a number of succeeding random access time windows based upon a schedule known to both the mobile station and the base station. After an initial reservation request as shown in FIG. 12, the mobile station has 3 reserved random access time slots 24 in the first two succeeding random access time windows. In the third random access time window, the mobile station has two reserved random access time slots 24 and in the fourth random access time window, the mobile station has one reserved random access time slot 24. Consequently, in the fifth succeeding random access time window, the corresponding random access time slot 25 is not reserved any more and available to other mobile stations. This application may be particularly applicable to bursty data which may require a larger number of initial random access slots to improve the initial access, but slower over a time period. This may occur for terminal emulation software. User commands need a fast response, however, if these commands initiate a large data transfer, the speed of access will not be required. FIG. 13 shows a block diagram of a base station 26 and two mobile stations 27, 28, incorporating the present invention. The base station 26 comprises an antenna 31, the first mobile station 27 comprises an antenna 29 and the second mobile station 28 comprises an antenna 30. The base station 26 and the two mobile stations 27, 28 are arranged and adapted to transmit and receive data in a code division multiple access telecommunication system according to the present invention as described above relating to FIGS. 2–12. The base station 26 and the two mobile stations 27, 28 thereby comprise the known elements, which are required for a proper operation. Thus, the base station 26 and the mobile stations 27, 28 according to the present invention comprise coders, encoders, interleavers, deinterleavers, modulators, demodulators, HF-receiving and transmission means and so on.

Figure 15:
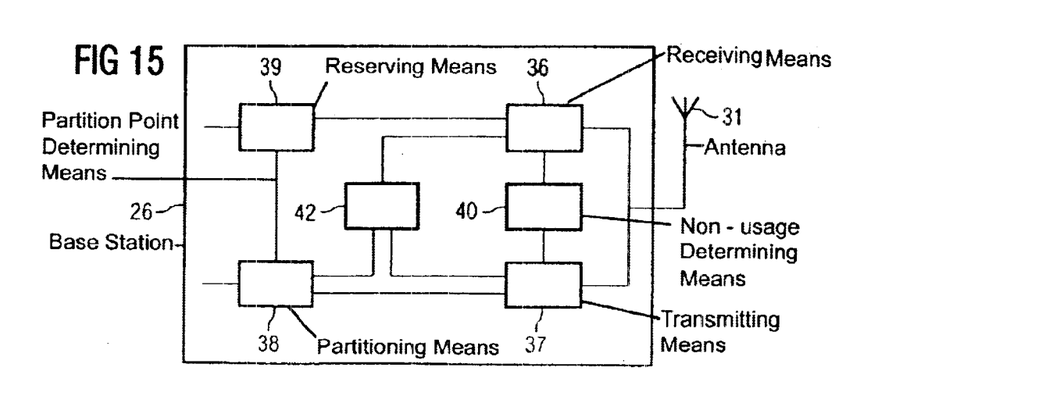
FIG. 15 shows a block diagram of a base station incorporating the present invention.

Further on, as shown in the block diagrams of FIGS. 14 and 15, the base station 26 and the mobile stations comprise the corresponding means for incorporating the present invention. Thus, the mobile station 27, which is shown in FIG. 14, comprises an antenna 29 coupled to a receiving means 32 and a transmitting means 33. The receiving means 32 is coupled with a means 35 for determining the partition point transmitted with partitioning information from a base station. The receiving means 32 receives the partitioning information and the means 35 for determining the partition point extracts the partition point from the received partitioning information. The means 34 for choosing a random access slot within a first section 2 of a random access time window is coupled to said means 35 for determining the partition point and also to a transmitting means 33 coupled to the antenna 29. The mobile station therefore knows from the received partitioning information, in which way the random access time windows are divided into the first section 2 and the second section 3, and the means 34 for choosing the random access slot correspondingly chooses a random access slot from the first section 2 to transmit random access data to the corresponding mobile station. The mobile station 27 further comprises a means 41 for generating statistical information on contention based random access attempts. Each time the mobile station 27 transmits random access data in a randomly chosen contention based random access slot over the transmitting means 33 and the antenna 29 to a corresponding base station 26, the receiving means 32 of the mobile station 27 receives information from the base station, if the random access data had been successfully transmitted. The reason is that there is always a possibility that two or more mobile stations simultaneously choose the same random access slot and that the correspondingly transmitted random access data are not successfully received in the base station. In case that the mobile station 27 receives information, that the random access data had not been successfully transmitted to the base station 26, this is called a failed contention based random access attempt. The means 41 for generating statistical information counts the failed contention based random access attempts within a certain time period, e.g. 50 ms. The resulting number of failed contention based random access attempts is a statistical information, which is transmitted, e.g. periodically, to the corresponding base station. The means 41 for generating statistical information is thus connected to the receiving means 32 and the transmitting means 33 of the mobile station 27. It is to be noted, that the means 41 for generating statistical information does not count the failed reservation based random access attempts. The receiving means 32, the transmitting means 33, the means 34 for choosing random access slots, the means 35 for determining the partition point, and the means 41 are further connected to the known means required for normal operation of a mobile station.

Figure 16:
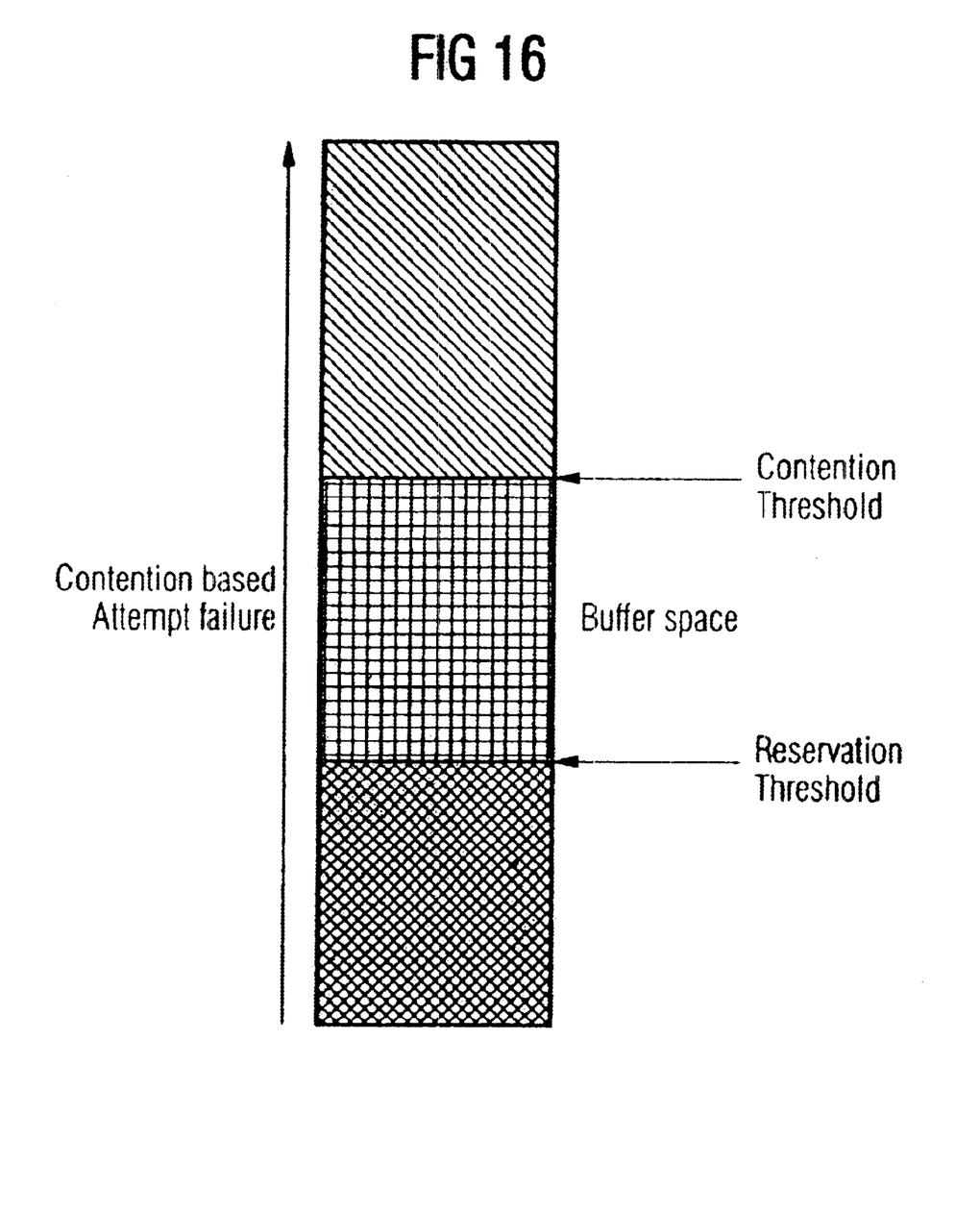
FIG. 16 shows a schematic diagram for explaining the contention threshold value and the reservation threshold value in relation to failed contention based random access attempts.

In FIG. 15, a block diagram of the base station 26 incorporating the present invention is shown. The base station 26 comprises a receiving means 36 and a transmitting means 37, which are both coupled to the antenna 31. A means 38 for partitioning the random access time windows in a first and a second section 2, 3 is coupled to the transmitting means 37. The means 38 for partitioning the random access time windows is thereby provided with information on the corresponding system requirements, on the basis of which it determines the partition point. The partitioning information is then transmitted over the transmitting means 37 and the antenna 31 to the corresponding mobile station, for example the mobile station 27. The means 38 for partitioning the random access time windows 1 sets the number of random access slots in the first and the second section 2, 3 variably depending on the partition point information received from a means 42 for determining the partition point and the transmitting means 37 transmits the partition point information periodically to the connected mobile stations. The means 42 for determining the partition point and the means 38 for partitioning the random access time window 1 could also be combined in one common means for determining the partition point and partitioning the random access time window 1. The means 42 for determining the partition point defines the partition point, in other words defines the number of contention based random access slots and the number of reservation based random access slots in the random access time window 1 on the basis of statistical information received by the receiving means 36 from one or more mobile stations 27, 28. The statistical information generated e.g. in the means 41 for generating statistical information in the mobile station 27 is transmitted to the base station 26 and then processed in the means 42 for determining the partition point. If, for example, statistical information on the accumulated number of failed contention based random access attempts from one or more mobile stations are received in the base station 26, the means 42 calculate the new partition point on the basis of the received information. The information on the new partition point generated in the means 42 is then supplied to the partitioning means 43, which partitions the random access time window 1 correspondingly. In a first embodiment of the means 42 for determining the partition point, a contention threshold value and a reservation threshold value are used to determine the partition point. In case that the total number of failed contention based random access attempts within a predetermined time period, which is an information received from one or more mobile stations 27, 28, reaches a predetermined contention threshold value, the means 42 increases the number of contention based random access slots in the random access time window 1, so that the partition point is moved. In case that the number of contention based failed random access attempts within a predetermined period of time falls under a predetermined reservation threshold value, the means 42 decreases the number of contention based random access slots in the random access time window 1, so that the partition point is moved in the other direction. The reservation threshold value is smaller than the contention threshold value, whereby a buffer space is provided between the two threshold values, as is shown in FIG. 16. The provision of the buffer space ensures, that the partition point is not changed each time that the failed contention based random access attempts vary slightly. Thus, the buffer space prevents oscillations of the partition point and thus decreases the amount of signaling required. FIG. 16 shows an example of the contention threshold setting and the reservation threshold setting. The exact threshold settings can be set dependent on the priorities of the network provider. In an alternative embodiment, the means 42 for determining the partition point calculate the partition point arithmetically using also the statistical information received from one or more mobile stations, e.g. the number of failed contention based random access attempts as is explained above. The means 42 for determining the partition point and the means 38 for partitioning the random access time window 1 are both connected to the transmitting means 37, which broadcasts each time a new partition point is determined the corresponding partition point information to the connected mobile station. The receiving means 36 receives random access data in one of the random access slots from the first sections 2 of random access time windows transmitted by a mobile station. The receiving means 36 is coupled to a means 39 for reserving random access slots in the second section 3 of the random access time windows in case that a random access bums transmitted in a contention based random access slot contains reservation information. The means 39 for reserving reservation based random access slots thereby extracts the reservation information from the received random access burst. Further, the means 39 for reserving reservation based random access slots generates a confirmation signal which is transmitted over the transmitting means 37 to the respective mobile station to confirm the reservation or to inform the mobile station, that no or fewer random access slots as required are reserved. The means 39 for reserving random access slots is thereby connected to the means 38 for defining the partition point, so that each time a new partition point is defined, information on the currently reserved random access slots can be respected. The base station 26 further comprises a means 40 for determining a non-usage of reserved random access slots in case that the base station operates according to the example shown in FIG. 11. Upon the determination of a non-usage of a predetermined number of reserved random access slots, the means 40 generates a corresponding cancellation signal, which is transmitted over the transmission means 37 to the mobile station, as described relating to FIG. 11.

Figure 17:
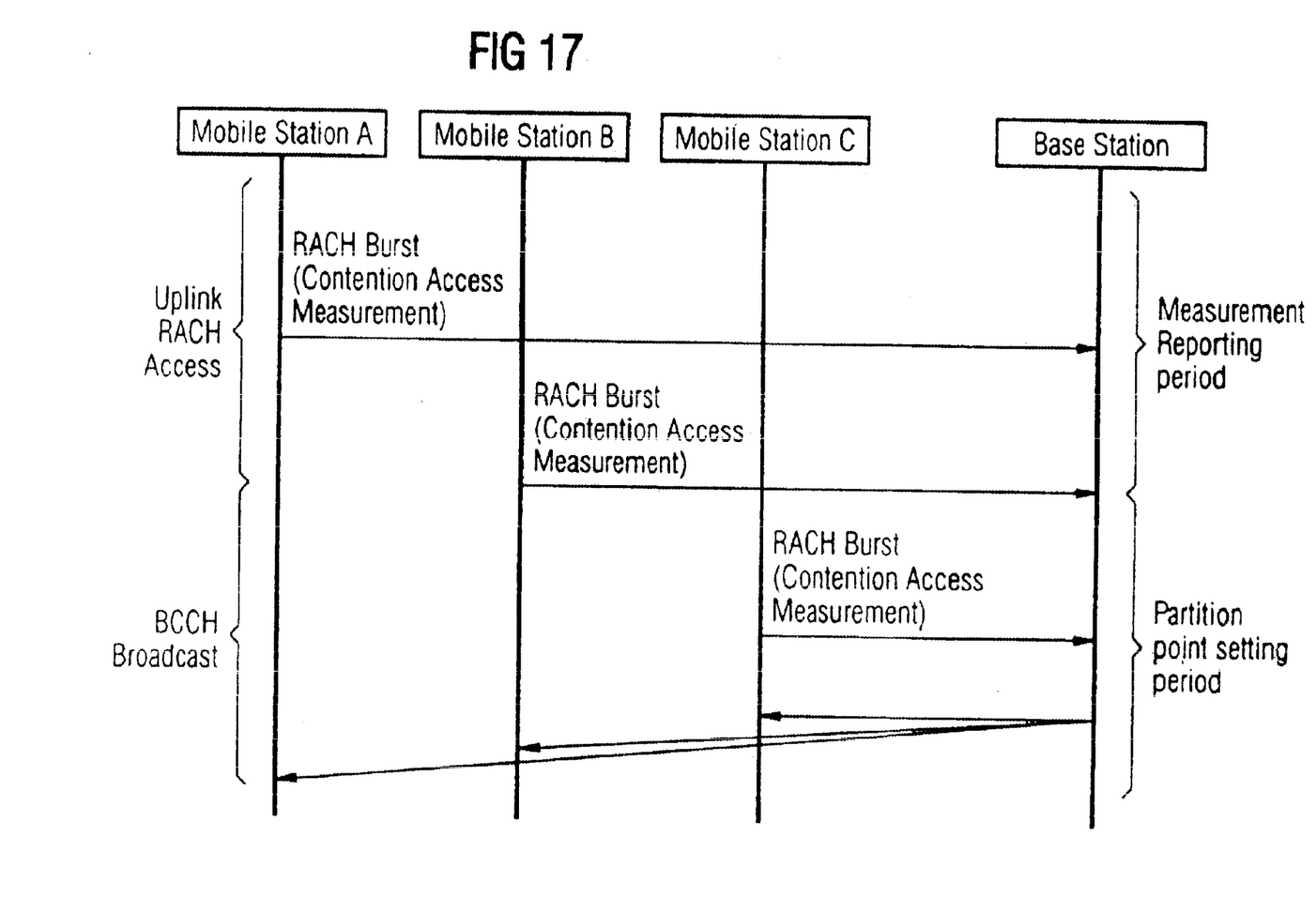
FIG. 17 shows a schematic diagram of a procedure of transmitting information on failed contention based random access attempts from three mobile stations to a base station, in which the corresponding optimal partition point is determined, and a corresponding partition point information is broadcast to the three mobile stations.

FIG. 17 shows an example of a partition point setting mechanism. Three mobile stations A, B, C transmit random access bursts in contention based random access slots comprising the number of failed contention based random access attempts within a reporting period, e.g. 50 ms. Alternatively, this information could be transmitted in a dedicated uplink channel. The base station receives the statistical information and processes this information, as described above, to generate a new partition point or to decide that the old partition point does not need to be changed. In each partition point setting period the base station broadcasts the new partition point to the base station. In case that a new partition point is not determined, but the old partition point remains unchanged, either no partition point information is broadcast or information is broadcast that the partition point remains unchanged. The reporting period may consist of a fixed period of time, e.g. 50 ms, or also be based on the number of access attempts. In the later case, the mobile stations report after a predetermined number of contention based random access attempts the number of the failed attempts to the base station. The setting period, which is the period, during which the new partition point is valid, may be based on a fixed time period or be based upon the amount of change in the reported statistical information. The mechanism then proceeds to the next reporting and setting period.

As stated above, the partition point is difficult to determine in a dynamically changing environment. A non-optimal setting of the partition point results in a system, where the resources of the random access time window are not fully utilized and an initial access or random access slot reservation requests cannot be completely fulfilled. For instance, if a larger number of reservation slots are made available in a random access time window, there may not be enough contention based random access slots in the random access time window available. The required number of contention based random access slots will increase as more mobile stations enter a cell and are connected to one base station. At the same time a number of reservation random access slots may remain unused and so resources are not used efficiently. The lack of enough contention based random access slots particularly exacerbates this problem since a reservation request cannot be made to utilize the available reservation slots. Alternatively, there may be more than sufficient contention based random access slots to suffice all requests within the cell. In this case, the conversion of these into reservation based random access slots allows the random access time window to be utilized more efficiently. The partition point must also be re-evaluated on a regular basis to maintain coherency with the dynamic nature of the cell. The method and the devices of the present invention thereby allows an effective way to set the partition point in real time.

A further advantage of the method and the devices according to the present invention is, that a big part of the contention based access is removed. Further, an efficient use of the random access channel and therefore the random access time windows is ensured, since, when contention based use is not in demand, more capacity can be given to reserved resources. Thereby, the partitioning can be changed dynamically. Further, the random access bursts can carry additional information embodied as either user or control data. This can be used to describe the type of channel required or to make a future reservation. Another advantage of the present invention is that changes to the layer 1 standards are not required. Further, the percentage partitioning of the random access time window can be employed optionally by a network provider. If he wishes not to use the capability, the number of reservation based random access slots can be set to zero.

Although in the above description the partitioning of a random access time window into two sections has been described, partitioning of a random access time window into three or more sections is possible. Further, as an additional feature to the partitioning of the random access time window, the random access slots within the different sections of the random access time window can be divided into groups having different priority classes. Since the random access data to be transmitted in the random access slots can have different transmission priorities, it can be ensured, that some types of random access data will have a better possibility of gaining access to the network due to the higher probability that a particular message will be successful in reaching the base station. The network can dynamically change the size of the groups depending on system requirements and broadcasts the corresponding information to the mobile station.

What is claimed is:

1. Method for transmitting and receiving data in a code division multiple access telecommunication system, comprising the steps of
   providing a random access time window (1) comprising a plurality of random access slots for transmitting random access data from at least one first communication device (27, 28) to a second communication device (26),
   determining a partition defining a number of contention based random access slots and a number of reservation based random access slots in the random access time window on the basis of statistical information generated in the at least one first communication device (27, 28), and
   partitioning the plurality of random access time slots into a first and a second section (2, 3) on the basis of said partition, whereby the first section contains one or more of the plurality of random access time slots which are designated as contention based random access slots and the second section (3) contains the remainder of the plurality of random access time slots which are designated as reservation based random access slots;
   whereby the random access time window is partitioned in two dimensions, time and code.

2. Method for transmitting and receiving data according to claim 1, characterized in, that each random access slot in said random access time window is defined by a time offset value and a preamble code.

3. Method for transmitting and receiving data according to claim 1, characterized in, that said statistical information is information on contention based random access attempts in said at least one first communication device (27, 28).

4. Method for and receiving data according to claim 3, characterized in, that said statistical information is the number of failed contention based random access attempts within a predetermined period of time.

5. Method for transmitting and receiving data according to claim 4, characterized in, that in said step of determining the partition the number of the contention based random access slots in said random access time window is increased in case that the number of failed contention based random access attempts reaches a predetermined contention threshold value.

6. Method for transmitting and receiving data according to claim 4, characterized in, that in said step of determining the partition the number of the contention based random access slots in said random access time window is decreased in case that the number of failed contention based random access attempts falls under a predetermined reservation threshold value.

7. Method for transmitting and receiving data according to claim 6, characterized in, that said reservation threshold value is smaller than said contention threshold value, whereby a buffer space is provided in between.

8. Method for transmitting and receiving data according to claim 1, characterized in, that in said determining step the partition is calculated arithmetically.

9. Method for transmitting and receiving data according to claim 1, characterized in,
   that said second communication device periodically broadcasts information about the partition of said random access time window to the at least one first communication device (27, 28).

10. Device (27, 28) for transmitting and receiving data in a code division multiple access telecommunication system, in which a random access time window (1) comprising a plurality of random access slots for transmitting random access data is provided, the plurality of random access slots being partitioned in a first and second section (2, 3), whereby the first section (2) contains one or more of the plurality of random access slots which are designated as contention based random access slots and the second section (3) contains the remainder of the random access slots which are designated as reservation based random access slots, with means (34) for randomly choosing a random access slot from said first section, means (33) for transmitting random access data in said chosen random access slot, and means (41) for generating statistical information on contention based random access attempts, whereby the random access time window is partitioned in two dimensions, time and code.

11. Device for transmitting and receiving data according to claim 10, characterized in, that said means (41) for generating statistical information determines the number of failed contention based random access attempts within a predetermined period of time.

12. Device for transmitting and receiving data according to claim 10, characterized in, that said means (41) for generating statistical information generates a corresponding information signal to be transmitted by said means (33).

13. Device for transmitting and receiving according to claim 10, characterized by means (32) for receiving periodically broadcast information about the partition of said random access time window (1).

14. Device for transmitting and receiving data according claim 10, characterized in, that each random access slot in said random access time window is defined by a time offset value and a preamble code.

15. Device (26) for transmitting and receiving data in a code division multiple access telecommunication system, in which a random access time window (1) comprising a plurality of random access slots for transmitting random access data is provided, with means (42) for determining a partition defining a number of contention based random access slots and a number of reservation based random access slots in the random access time window on the basis of received statistical information, means (38) for partitioning the plurality of random access slots in a first and second section (2, 3) on the basis of said partition, whereby the first section (2) contains one or more of the plurality of random access slots which are designated as contention based random access slots and the second section (3) contains the remainder of the plurality of random access time slots which are designated as reservation based random access slots, and means (37) for broadcasting information about the partition of said random access time window (1);

whereby the random access time window is partitioned in two dimensions, time and code.

16. Device for transmitting and receiving data according to claim 15, characterized by means (36) for receiving said statistical information from at least one further device (27, 28) for transmitting and receiving data.

17. Device for transmitting and receiving data according to claim 16, characterized in, that said statistical information is information on contention based random access attempts generated in said at least one further device (27, 28).

18. Device for transmitting and receiving data according to claim 17, characterized in, that said statistical information is the number of failed contention based random access attempts of said at least one further device (27, 28) within a predetermined period of time.

19. Device for transmitting and receiving data according to claim 18, characterized in, that in means (42) for determining the partition the number of the contention based random access slots in said random access time window is increased in case that the number of failed contention based random access attempts reaches a predetermined contention threshold value.

20. Device for transmitting and receiving data according to claim 18, characterized in, that in said means (42) for determining the partition the number of the contention based random access slots in said random access time window is decreased in case that the number of failed contention based random access attempts falls under a predetermined reservation threshold value.

21. Device for transmitting and receiving data according to claim 20, characterized in, that said reservation threshold value is smaller than said contention threshold value, whereby a buffer space is provided in between.

22. Device for transmitting and receiving data according to claim 15, characterized in, that in said determining means (42) the partition is calculated arithmetically.

23. Device for transmitting and receiving data according to claim 15, characterized in, that each random access slot in said random access time window is defined by a time offset value and a preamble code.

* * * * *